(12) United States Patent  
Flower et al.

(10) Patent No.: US 9,256,542 B1  
(45) Date of Patent: Feb. 9, 2016

(54) ADAPTIVE INTELLIGENT STORAGE CONTROLLER AND ASSOCIATED METHODS

(75) Inventors: Jonathan Flower, Lafayette, CA (US); Kumar Gajjar, San Jose, CA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 246 days.

(21) Appl. No.: 12/558,925

(22) Filed: Sep. 14, 2009

Related U.S. Application Data

(60) Provisional application No. 61/097,831, filed on Sep. 17, 2008, provisional application No. 61/122,281, filed on Dec. 12, 2008.

(51) Int. Cl.  
*G06F 12/00* (2006.01)  
*G06F 12/08* (2006.01)  
*G06F 3/06* (2006.01)  
*G06F 9/52* (2006.01)

(52) U.S. Cl.  
CPC ............ *G06F 12/0866* (2013.01); *G06F 12/00* (2013.01)

(58) Field of Classification Search  
CPC . H04L 67/1097; G06F 12/0866; G06F 12/00; G06F 3/67; G06F 9/52  
See application file for complete search history.

(56) References Cited

U.S. PATENT DOCUMENTS

| | | | |
|---|---|---|---|
| 7,415,506 B2 * | 8/2008 | Gajjar et al. | 709/215 |
| 7,899,987 B2 * | 3/2011 | Salomon et al. | 711/112 |
| 8,117,396 B1 * | 2/2012 | Fair et al. | 711/133 |
| 2002/0156987 A1 * | 10/2002 | Gajjar et al. | 711/203 |
| 2005/0240726 A1 * | 10/2005 | Williams | 711/114 |
| 2007/0035652 A1 * | 2/2007 | Toyoda et al. | 348/333.05 |
| 2007/0162700 A1 * | 7/2007 | Fortin et al. | 711/118 |
| 2007/0168564 A1 * | 7/2007 | Conley et al. | 710/1 |
| 2008/0215800 A1 * | 9/2008 | Lee et al. | 711/103 |
| 2008/0275925 A1 * | 11/2008 | Kimmel | 707/204 |
| 2009/0274027 A1 * | 11/2009 | Tanaka et al. | 369/47.55 |
| 2009/0276588 A1 * | 11/2009 | Murase | 711/160 |

* cited by examiner

*Primary Examiner* — Idriss N Alrobaye  
*Assistant Examiner* — Ronald Modo  
(74) *Attorney, Agent, or Firm* — Martine Penilla Group, LLP

(57) ABSTRACT

A storage controller includes data transfer logic defined to enable block level data transfer between the storage controller and multiple types of storage media within a storage volume. The storage controller also includes adaptive logic defined to determine in real-time which of the multiple types of storage media in the storage volume is to be used to store a given data block received by the storage controller. The received data block is stored on a determined storage medium in the storage volume. The data transfer logic and the adaptive logic are defined to maintain a normal interface between the storage controller and an operating system in communication with the storage controller, such that the multiple types of storage media in the storage volume is not apparent to the operating system.

20 Claims, 10 Drawing Sheets ical storage device. While this caching technique is effective in utilizing some of the properties of the multiple storage media types (e.g., fast writes to rotating disk, long-term retention on magnetic or optical media), the caching technique detrimentally involves maintaining multiple copies of large amounts of data, which can rapidly consume valuable storage system resources.

ADAPTIVE INTELLIGENT STORAGE CONTROLLER AND ASSOCIATED METHODS

CLAIM OF PRIORITY

This application claims priority under 35 U.S.C. 119(e) to U.S. Provisional Patent Application No. 61/097,831, filed Sep. 17, 2008, entitled "Adaptively Intelligent I/O Controller and Associated Methods." This application also claims priority under 35 U.S.C. 119(e) to U.S. Provisional Patent Application No. 61/122,281, filed Dec. 12, 2008, entitled "Adaptively Intelligent Storage Controller and Associated Methods." The disclosures of the above-identified provisional patent applications are incorporated herein by reference.

BACKGROUND

An input/output (I/O) subsystem connects some kind of computing device such as a server, desktop or notebook computer to one or more data storage devices on which data can be stored in a non-volatile manner. Examples of such data storage devices, i.e., computer readable/writable media, include:
  optical devices such as CD or DVD disks,
  rotating media such as disk drives of various types,
  removable media such as magnetic tapes, and
  non-volatile memory devices such as flash memory or solid state drives, among others.

A storage subsystem is implemented by a controller which is accessed by the computing device either via some kind of local bus, or over a network which can itself be used for either storage, messaging, or a combination thereof. One type of conventional controller is a disk storage controller which connects a server to one or more rotating disk storage devices which may reside in either the same chassis as the server, or an external chassis. Another type of conventional controller is defined to interface with an optical medium storage device. Yet another type of conventional controller is defined to interface with a magnetic medium storage device. However, it should be understood that conventional controllers are not defined to control a mixture of different storage device types. Therefore, a conventional storage volume exposed to an attached host does not include a mixture of different storage media types.

Conventional storage subsystems avoid mixing different storage media types in a common storage volume because the performance attributes of the different storage media types can be substantially different, and because the access patterns supported by the different storage media types can be substantially different. For example, rotating disk drives can typically be accessed in a random manner, with the computing device requesting read or write access to any part of the disk any number of times. In contrast, an optical storage device can usually be read multiple times, but written only once, and even then in a sequential manner. In further contrast, magnetic storage media, e.g., tape, can usually be read or written a number of times but access must be sequential, i.e., the data blocks on the magnetic storage media should be read or written in a particular order.

One conventional approach for facilitating use of multiple storage media types in a coherent fashion is to use a caching technique. For example, systems may combine the use of rotating disk, magnetic, or optical storage devices. In such a configuration, it is possible for an application to save data to a rotating disk, making use of the rotating disk capability to read and write data blocks in any order at any time. Then, once a large amount of data has been copied to the rotating disk, the large amount of data is written in a sequential manner to a magnetic tape storage device or to an optical storage device. While this caching technique is effective in utilizing some of the properties of the multiple storage media types (e.g., fast writes to rotating disk, long-term retention on magnetic or optical media), the caching technique detrimentally involves maintaining multiple copies of large amounts of data, which can rapidly consume valuable storage system resources.

Another conventional approach for facilitating use of multiple storage media types in a coherent fashion involves technology called "Information Life Cycle Management" (ILM). In this approach, data is initially stored on a first storage medium of a type usually selected for its performance characteristics. Then, at some later point in time a software component is activated to transfer data from the first storage medium to some second storage medium, wherein the second storage medium is usually selected based on its lower cost. The ILM software component moves the data from one location to another and typically deletes the initial copy. As a result, the ILM approach differs from the caching approach in that there is only one active copy of the data at any time. However, the ILM approach is not optimal with regard to a number of considerations.

For example, in unsophisticated ILM implementations, a user is responsible for understanding that data has been moved between storage devices. Therefore, when subsequent access to the data needs to be made, the user must know to retrieve the data from the secondary storage medium to which it was copied, rather than from the storage medium on which is was initially stored. In more advanced ILM implementations, the ILM software component is defined to leave behind some indication (sometimes called a "stub") which indicates that the data has been moved and the location where the data has been moved. Then, at a subsequent time when the user attempts to retrieve the data, the ILM software component intervenes and retrieves the data from its secondary location based on the information in the stub. It should be understood, however, that implementation of an advanced ILM system such as that described above often requires extremely complex and expensive software. Additionally, ILM systems are usually applied at high levels in the operating system stack, thereby manipulating entire files at one time, as opposed to individual data blocks, thereby reducing storage system efficiency and operating system independence relative to the storage system.

SUMMARY

In one embodiment, a storage controller is disclosed. The storage controller includes data transfer logic defined to enable block level data transfer between the storage controller and multiple types of storage media within a storage volume. The storage controller also includes adaptive logic defined to determine in real-time which of the multiple types of storage media in the storage volume is to be used to store a given data block received by the storage controller. The given data block is stored on a determined storage medium in the storage volume.

In another embodiment, a storage system is disclosed. The storage system includes a storage volume including multiple types of storage media. The storage volume is viewed as a monolithic storage volume by an operating system. Each of the multiple types of storage media in the storage volume is a non-volatile data storage device that operates in accordance with a native low-level block protocol (NLLBP). The storage system also includes a storage controller defined to direct NLLBP data transfers to and from the multiple types of storage media within the storage volume.

In another embodiment, a method is disclosed for operating a storage controller. The method includes an operation for connecting the storage controller to multiple types of storage media within a storage volume. The storage controller is defined to conduct data communication with each of the multiple types of storage media. The method also includes an operation for receiving a data block from an operating system. The method further includes an operation for selecting a storage medium, of the multiple types of storage media, to be used to initially store the received data block. In another operation, the received data block is transferred to a storage location on the selected storage medium.

Other aspects of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail so as to avoid unnecessarily obscuring the present invention.

Figure 1:
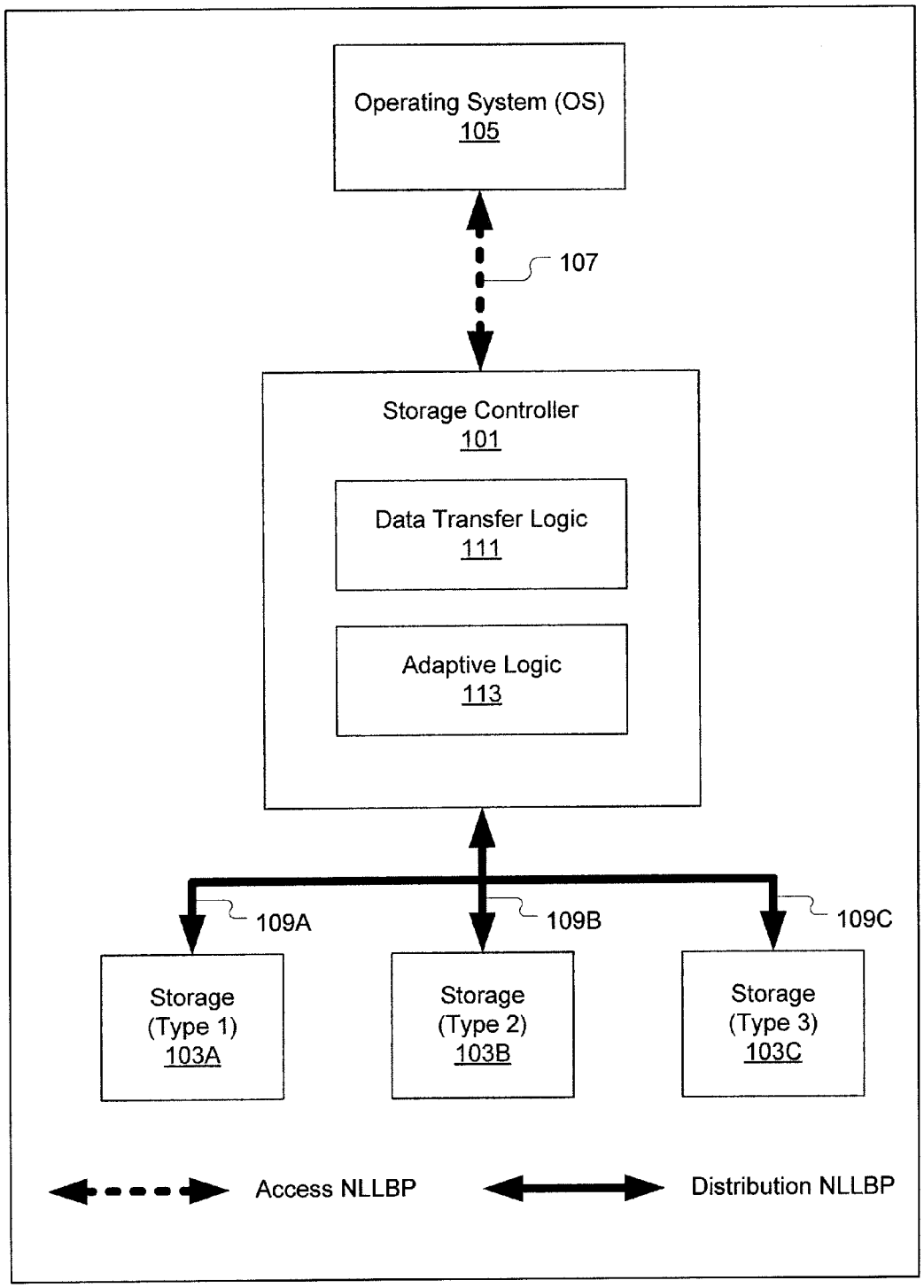
FIG. 1 is an illustration showing a storage controller, in accordance with one embodiment of the present invention.

FIG. 1 is an illustration showing a storage controller 101, in accordance with one embodiment of the present invention. More specifically, the storage controller 101 is defined as an actively intelligent storage controller defined to simultaneously support and communicate with multiple different types of storage media. As used herein, the terms storage medium and storage device are interchangeable. Also, as used herein, the term storage media refers to a plurality of storage media/storage devices. For example, FIG. 1 shows the storage controller 101 in communication with multiple types of storage media 103A-103C.

The storage controller 101 is defined to communicate with an operating system 105 through use of an access native low level block protocol (NLLBP), as indicated by arrow 107. The storage controller 101 is also defined to communicate with each of the multiple types of storage media 103A-103C using a distribution NLLBP, as indicated by arrows 109A-109C, respectively. It should be understood, however, that each of the multiple types of storage media 103A-103C may be accessed by the storage controller 101 using different types of NLLBP, wherein each of the different types of NLLBP may be specifically associated with a particular type of storage medium. It should be understood that the storage controller 101 may be deployed in a server box, in a storage box, or in a network switch, among other locations. The storage controller 101 may also be deployed simultaneously in multiple locations within a system architecture.

The multiple types of storage media 103Aa-103C can be combined to form a storage volume, wherein the storage volume is viewed as a monolithic storage volume by the operating system 105. The storage volume as referenced herein may also be considered as a logical volume when viewed from a perspective of the operating system 105. For ease of discussion the term storage volume is used hereafter. The storage controller 101 includes data transfer logic 111 defined to enable block level data transfer between the storage controller 101 and the multiple types of storage media 103A-103C within the storage volume. The storage controller 101 also includes adaptive logic 113 defined to determine in real-time which of the multiple types of storage media 103A-103C is to be used to store a given data block received by the storage controller 101, such that the given data block is stored on a determined storage medium.

Each of the multiple types of storage media 103A-103C in the storage volume is a non-volatile data storage device that operates in accordance with a NLLBP, wherein the NLLBP may vary between the multiple types of storage media 103A-103C. The different types of non-volatile storage media 103A-103C may include a rotating disk data storage device, a solid-state data storage device, a re-writable optical data storage device, or any combination thereof, among others. Additionally, although exemplary FIG. 1 depicts three types storage media 103A-103C, it should be understood that the storage controller 101 can be connected to essentially any number of storage media of essentially any type. The adaptive logic 113 of the storage controller 101 is defined to ensure that data blocks are stored on the various types of storage media 103A-103C so as to optimize utilization of the capabilities of the various types of storage media 103A-103C, thereby optimizing performance and utilization of the storage volume.

The storage controller 101 implements an adaptively intelligent process to manage data block placement on the various types of storage media 103A-103C within the storage volume. The adaptive logic 113 is defined to implement the adaptively intelligent process. It should be understood that although the storage controller 101 operates to distribute data blocks across the multiple different types of storage media 103A-103C within the storage volume, the storage controller 101 maintains a normal interface with the operating system 105 or other entity accessing the storage volume. Thus, the storage controller 101 is defined to ensure that the operating system 105 or other entity can access the mixed media storage volume through normal processes, without requiring modification of the operating system 105 or other entity.

The storage controller 101 is defined to take advantage of fundamental differences between various non-volatile storage media 103A-103C that make up the storage volume, while ensuring that the operating system 105 that communicates with the storage controller 101 maintains an understood view of the storage volume. To this end, the storage controller 101 is defined to understand the performance and physical property differences between various non-volatile storage media 103A-103C of the storage volume, and is defined to make decisions in real-time as to which non-volatile storage medium 103A-103C should be used to store certain data blocks.

In one embodiment, the storage controller 101 can be programmed to recognize different types of non-volatile storage devices 103A-103C connected thereto. In this embodiment, the storage controller 101 may include an understood set of performance and physical characteristics for the different storage media 103A-103C. In another embodiment, when a user connects a non-volatile storage device 103A-103C to the storage controller 101, the storage controller 101 provides an interface through which the user can specify properties of the connecting storage device. In another embodiment, when a user connects a non-volatile storage device 103A-103C to the storage controller 101, the non-volatile storage device 103A-103C provides an interface through which the storage controller 101 can learn properties of the connecting storage device. Based on the performance and physical characteristics of the multiple different types of storage media 103A-103C, the storage controller 101 operates to determine where data blocks are to be initially stored in storage volume, and where and when data blocks are to be moved between different types of storage media 103A-103C within the storage volume. Therefore, the storage controller 101 is defined to store data blocks on various types of storage media within the storage volume based on an algorithm that operates on both performance and physical characteristics of various types of storage media within the storage volume.

For example, the storage controller 101 may be defined to consider performance properties of the multiple different types of storage media 103A-103C, such as access type (streaming access versus random access), read speed, write speed, block size requirements (minimum, maximum, or optimal block size required for effective use of storage device), among others. Additionally, the storage controller 101 may be defined to consider physical properties of the multiple different types of storage media 103A-103C, such as reliability (failure rate) and lifetime (mean time to failure or maximum number of allowed operations), among others. The adaptive logic 113 of the storage controller 101 provides for optimization of data block storage across the multiple different types of storage media 103A-103C within the storage volume by considering a combination of factors such as the following by way of example:

rate at which data is read and/or written by different storage media;
number of times a particular data block is accessed;
method by which a particular data block is accessed;
performance characteristics of the various storage media and their associated NLLBPs;
access requirements of the various storage media and their associated NLLBPs (such as a need to access the storage medium sequentially versus randomly);
access optimizations available for the various storage media and their associated NLLBPs (such as modifications to storage algorithms to tune performance for underlying storage device characteristics);
life-cycle characteristics of the various storage media;
retention requirements for stored data blocks;
relative storage capacities of the various storage media; and/or
user defined data retention policies.

Because certain attributes of the storage volume may vary dynamically over time, such as the number of times a particular data block is accessed, the adaptive logic 113 of the storage controller 101 is defined to react to changes in the attributes of the storage volume in real-time. Moreover, in one embodiment, the storage controller 101 is defined to store each received data block on an appropriate type of storage medium 103A-103C in real-time, without having to copy the received data block between different storage media within the storage volume prior to storing the received data block on the appropriate type of storage medium.

For example, a storage volume may be defined to include both high-speed and low-speed rotating disk drives. Initially, it may be appropriate to store as many data blocks as possible on the high speed disk drive, but as time passes it may be advisable to migrate some of those data blocks to the lower speed disk drive, thereby freeing storage space on the high speed disk drive for newly received data blocks.

In another example, a storage volume may be defined to include a combination of a rotating disk drive and a solid state drive, e.g., flash storage device. In this exemplary embodiment, data blocks may be stored on the solid state drive using optimized algorithms tuned specifically to the unique access methods of the solid state drive. It should be understood that the storage controller 101 is defined to convert a set of NLLBP commands from its host, such as the operating system 105, into a second set of commands optimized for use with the target storage medium, such as the solid state drive. As more data blocks are written to the solid state drive, it may be desirable to migrate data blocks from the solid state drive to the rotating disk drive, thereby freeing storage space on the solid state drive for newly received data blocks. The storage controller 101 is defined to determine an appropriate algorithm for selecting the data blocks to be migrated and a set of associated NLLBP commands to perform the data block migration.

The algorithm needed to store data blocks can vary significantly between the various types of non-volatile storage devices in the storage volume. For example, current solid state drives, such as those based on NAND flash memory devices, generally require that data blocks be written sequentially and that the data blocks be of a large size. Also, current solid state drives require that an erase operation be performed when existing data is to be overwritten. In contrast, rotating disk drives, such as hard drives, allow for data to be written anywhere on the disk and in small data block sizes. Also, rotating disk drives do not require an erase operation when data is to be overwritten. Therefore, the storage controller 101, i.e., the adaptive logic 113 and data transfer logic 111, is defined to implement different algorithms to store data blocks on the solid state drives versus the rotating disk drives.

For example, when the storage controller 101 is to store data on the rotating disk drive, the storage controller 101 operates to write the data to a location on the rotating disk drive without regard to data block size and without regard to overwriting of data already present on the rotating disk drive. However, when the storage controller 101 is to store data on the solid state drive, the storage controller 101 is defined to collect enough data to satisfy the minimum data block size criteria of the solid state drive, i.e., a size of the erasable unit of the solid state drive. Then, the storage controller 101 operates to write the data on the solid state drive. Furthermore, to enable data retrievability, the storage controller 101 is defined to maintain a mapping of where data blocks are written on the various storage media of the storage volume.

It should be understood that the algorithms implemented by the storage controller 101 for mapping data to the multiple different types of storage media may vary dramatically between different storage media types. For example, in a solid state drive it is important to perform writes (and the associated erasures) in large blocks, as mentioned above; however, reads can be made to any portion of the solid state drive with no performance penalty. In contrast, while rotating disk drives support write operations of much smaller granularity, as mentioned above, the rotating disk drives are less efficient than solid state drives at randomly accessing data. The storage controller 101 is defined to determine an optimized layout of data across the multiple types of storage media so as to take advantage of their differing attributes.

In one embodiment, the storage controller 101 uses local memory, such as a cache memory on board the storage controller 101, to assist with implementation of the adaptively intelligent storage process. Also, in various embodiments, the storage controller 101 may be responsible for implementing other algorithms in the data path, such as RAID data protection. Implementation of other algorithms by the storage controller 101 does not impact its implementation of the adaptively intelligent storage process across the storage volume that includes multiple different types of storage media.

Figure 2:
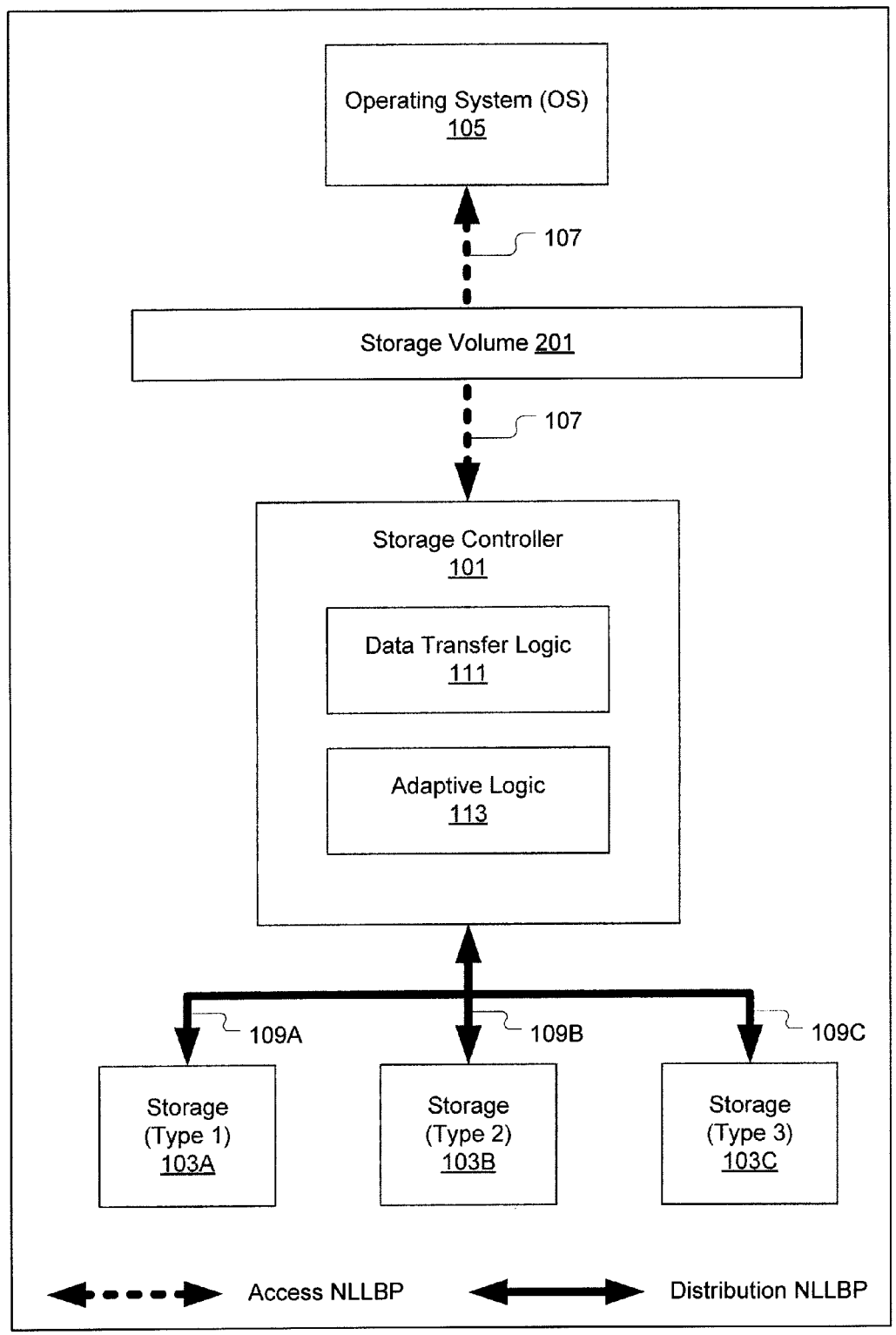
FIG. 2 shows the storage controller deployed to form a storage volume that spans different types of storage devices, while still appearing as a single storage volume to devices using the access NLLBP, in accordance with one embodiment of the present invention.

FIG. 2 shows the storage controller 201 deployed to form a storage volume 201 that spans different types of storage devices 103A-103C, while still appearing as a single storage volume to devices using the access NLLBP, in accordance with one embodiment of the present invention. A layout of data within the storage volume 201 is determined based on the characteristics of the storage media 103A-103C and the data being accessed. Multiple different data layouts can be utilized within the storage volume 201, ranging from simple concatenation of storage across the storage media 103A-103C to very fine data layout mapping.

To facilitate management and control of the storage volume 201, metadata is maintained by the storage controller 101. This metadata includes a base type of metadata that includes information that enables the storage controller 101 to track data block locations across the various storage media 103A-103C. In one embodiment, auxiliary types of metadata can also be used to maintain records of data block activity, such as accesses and movements. In various embodiments, the metadata of various types can be stored on one or more of the storage media 103A-103C, or on the storage controller 101 itself, e.g., in a memory onboard the storage controller 101, or on essentially any other storage medium that is accessible by the storage controller 101. Also, it should be understood that some types of metadata may be stored in a persistent manner, i.e., long-term manner, while other types of metadata may be stored in a transient manner, i.e., short-term manner. Additionally, regardless of type, metadata is not required to be stored in one place, or on one device, or in a single data block. Metadata of various types can be stored in any number of places, on any number of devices, and in any number of data blocks. Furthermore, any type of metadata describing a single data block may be divided into several portions, which may be stored in different locations.

Each type of non-volatile storage medium within the storage volume may require one or more specific types of metadata, including base metadata and in some cases auxiliary metadata. The storage controller 101 is defined to generate and maintain each type of metadata as required by the various types of storage media within the storage volume. In one embodiment, some or all of the metadata associated with the storage volume is stored in a non-volatile state on one or more of the storage media of the storage volume. In one embodiment, some or all of the metadata for the storage volume is maintained on one or more storage devices of the logical volume that provides for fast read access. In this embodiment, the storage controller 101 will access base metadata on the one or more storage devices to determine where a given data block is stored within the storage volume. Also in this embodiment, the storage controller 101 may access auxiliary metadata on the one or more storage devices to perform various operations or analyses associated with data block storage within the storage volume. In another embodiment, a current copy of the base metadata for the storage volume is loaded into a cache of the storage controller 101 to enable fast determination of where a given data block is stored within the storage volume.

It should be understood that the base metadata is stored in a manner in which it can be accessed at least as fast as data can be accessed from the storage medium of the associated data blocks in the storage volume. For example, if the fastest read access of data in the storage volume occurs on a solid state drive, then the base metadata for the data blocks stored in the solid state drive may be stored on the solid state drive or on a faster storage device.

The various types of metadata can be implemented in many different ways. The storage controller 101 knows by way of the base metadata where each data block is stored across the various storage media of the storage volume. Additionally, in one embodiment, the auxiliary metadata can include information about the access history of each data block. For example, the storage controller 101 can record data block access frequency and/or patterns in the auxiliary metadata. For example, when a given data block is accessed through the storage controller 101, a number of accesses to the given data block as recorded in the auxiliary metadata can be incremented by the storage controller 101. Additionally, by operating on the various types of metadata, the storage controller 101 can make decisions about where certain data blocks should be stored based on the attributes of the different types of storage media within the storage volume, so as to optimize data input/output performance and storage device utilization.

Figure 3:
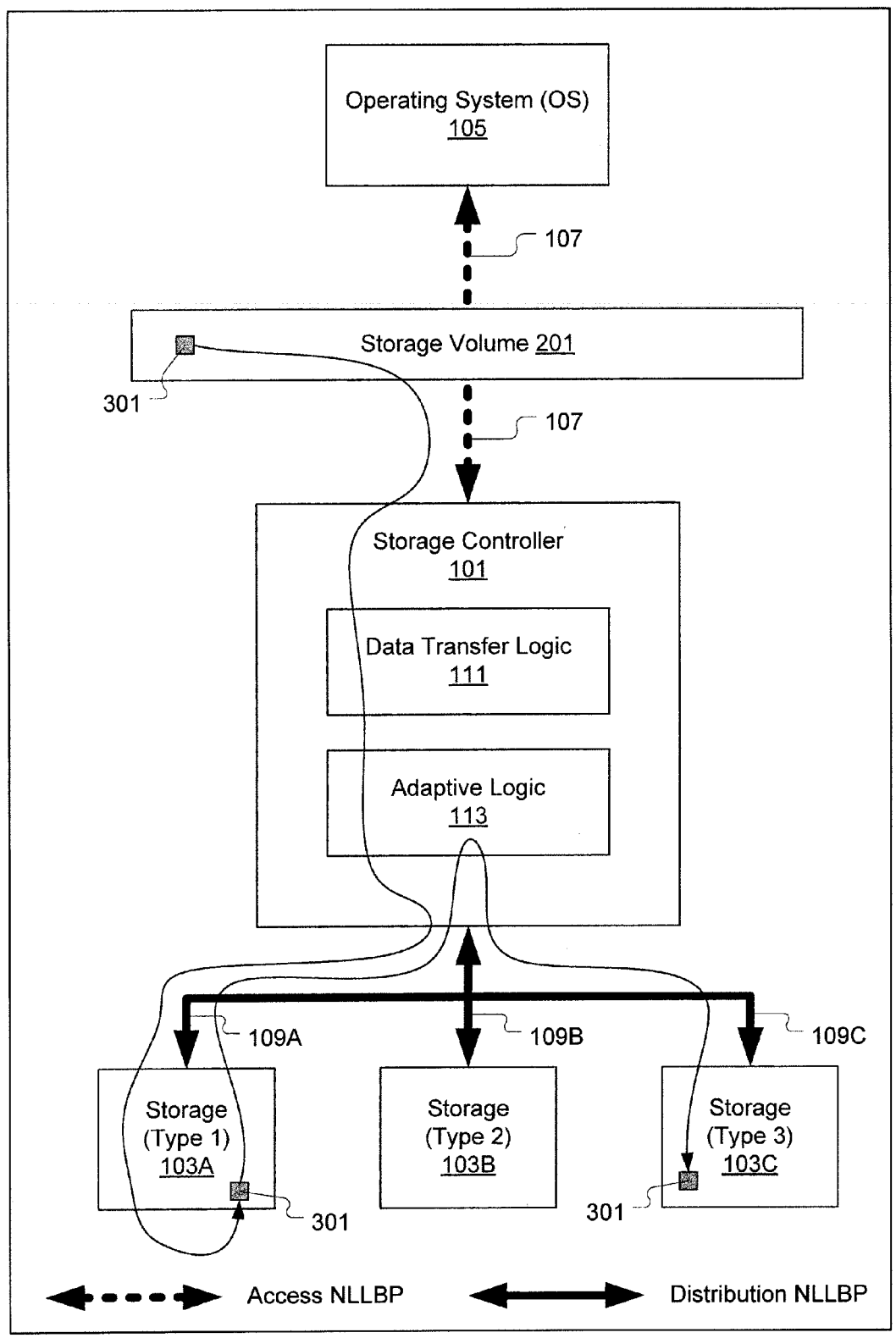
FIG. 3 illustrates operation of the storage controller to migrate data between different storage media within the storage volume without impacting applications that are accessing the storage controller, in accordance with one embodiment of the present invention.

FIG. 3 illustrates operation of the storage controller 101 to migrate data between different storage media within the storage volume without impacting applications that are accessing the storage controller 101, in accordance with one embodiment of the present invention. FIG. 3 shows a data block 301 that has initially been written to the "Type 1" storage medium 103A. At some future time the adaptive logic 113 inside the storage controller 101 determines that the data block 301 should be moved to the "Type 3" storage medium 103C. The storage controller 101 operates to move the data block 301 from the "Type 1" storage medium 103A to the "Type 3" storage medium 103C, and make corresponding adjustments to the base metadata associated with data block 301, without adversely impacting the availability and performance of the storage volume to other applications accessing the storage controller 101.

Figure 4:
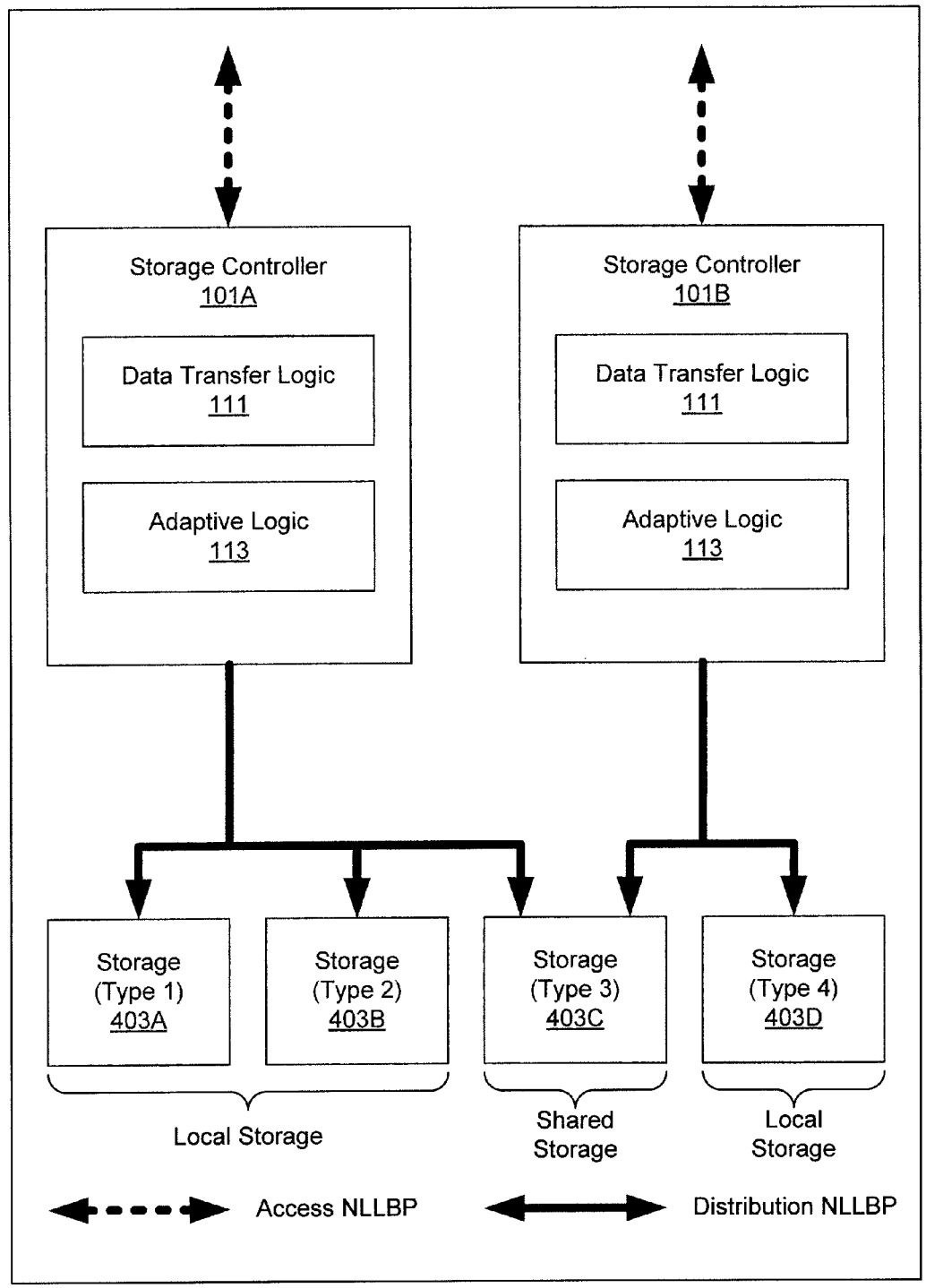
FIG. 4 shows an example of multiple storage controllers deployed in conjunction with a number of dedicated storage media, and a shared storage medium, in accordance with one embodiment of the present invention.

FIG. 4 shows an example of multiple storage controllers 101A and 101B deployed in conjunction with a number of local storage media 403A, 403B, 403D, and a shared storage medium 403C, in accordance with one embodiment of the present invention. In this embodiment, the adaptive logic 113 operating in each of the storage controllers 101A and 101B determines where and how data blocks are to be stored so as to best match the attributes of both the local storage media 403A, 403B, 403D, and the shared storage medium 403C. In one embodiment, the shared storage medium 403C may be associated with multiple storage volumes. For example, if the storage controllers 101A and 101B are responsible for separate storage volumes, the shared storage medium 403C is associated with multiple storage volumes. Moreover, the storage controllers 101A and 101B can hide the sharing of the storage medium 403C from different entities accessing data on the shared storage medium 4030.

Figure 5:
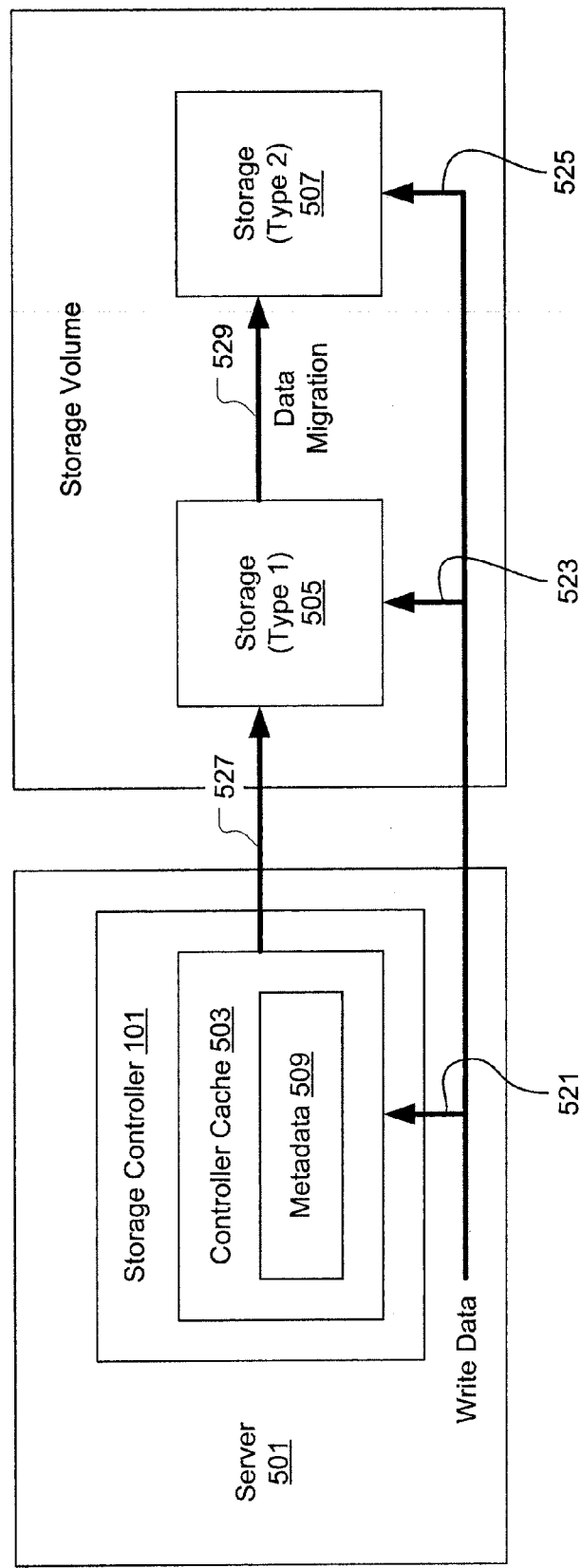
FIG. 5 shows an exemplary implementation of the storage controller, in accordance with one embodiment of the present invention.

FIG. 5 shows an example implementation of the storage controller 101, in accordance with one embodiment of the present invention. It should be understood that the particular implementation of FIG. 5 is provided by way of example. The particular example of FIG. 5 shows the storage controller 101 implemented inside a server computer system 501. However, in other embodiments, the storage controller 101 can be implemented outside of a server, in another device, as a standalone device, or in essentially any other manner that is not specifically exemplified herein. In one embodiment, the server 501 is an application server. The storage controller 101 has its own local cache 503 and is connected to two storage devices 505 and 507. In one embodiment, the storage device 505 is a solid state drive (SSD), and the storage device 507 is a rotating hard disk drive (HDD). However, it should be understood that in other embodiments the two storage devices 505 and 507 can be respectively defined as essentially any other type of storage device. Additionally, in other embodiments, either or both of the storage devices 505 and 507 can be defined by a plurality of storage devices.

For data blocks that are to be written, the adaptive logic 113 of the storage controller 101 implements a policy whereby data blocks that are smaller than an optimal write size for the solid state drive 505 are collected in the cache 503 of the storage controller 101 until an aggregate size of the number of data blocks collected in the cache 503 satisfies the optimal write criteria for the solid state drive 505, as indicated by arrow 521. At this point, the data blocks collected in the cache 503 are written to the solid state drive 505, as indicated by arrow 527. Note that in this implementation, the collection of data blocks in the cache 503 potentially includes many disjoint data blocks as viewed from a perspective of the application server 501. In this regard, the base metadata 509 provides for mapping of data blocks within the storage volume to the originally received data blocks that were collected in the cache 503.

The adaptive logic 113 is further responsible for migrating data blocks from the solid state drive 505 to the rotating hard disk drive 507, as indicated by arrow 529. In one embodiment, the adaptive logic 113 implements a policy for migrating data blocks between storage devices 505 and 507 within the storage volume. This policy may consider a number of performance and physical properties of the various storage devices 505 and 507, such as read and write access speed and reliability, among others.

The adaptive logic 113 within the storage controller 101 is defined to optimize utilization of the solid state drive 505 and rotating hard disk drive 507, while simultaneously satisfying the performance requirements of the application server 501. The storage controller 101 is defined to perform this optimization transparently so that the application server 501 can continue to operate without modification or interruption of its operating system and/or applications.

Further with regard to FIG. 5, if the aggregate size of the incoming data blocks to be written already satisfies the optimal write criteria for the solid state drive 505, then the incoming data blocks may be written directly to the solid state drive 505 and bypass the controller cache 503, as indicated by arrow 523. Additionally, if the aggregate size of the incoming data blocks to be written is large enough to satisfy an administrator-set threshold size value, then the incoming data blocks may be written directly to the rotating hard disk drive 507 and bypass both the controller cache 503 and the solid state drive 505, as indicated by arrow 525. Additionally, it should be understood that the storage controller 101 is defined to enable reading of data blocks directly from their current storage location in either the controller cache 503, or any storage device within the storage volume (e.g., SSD 505 or HDD 507).

Figure 6:
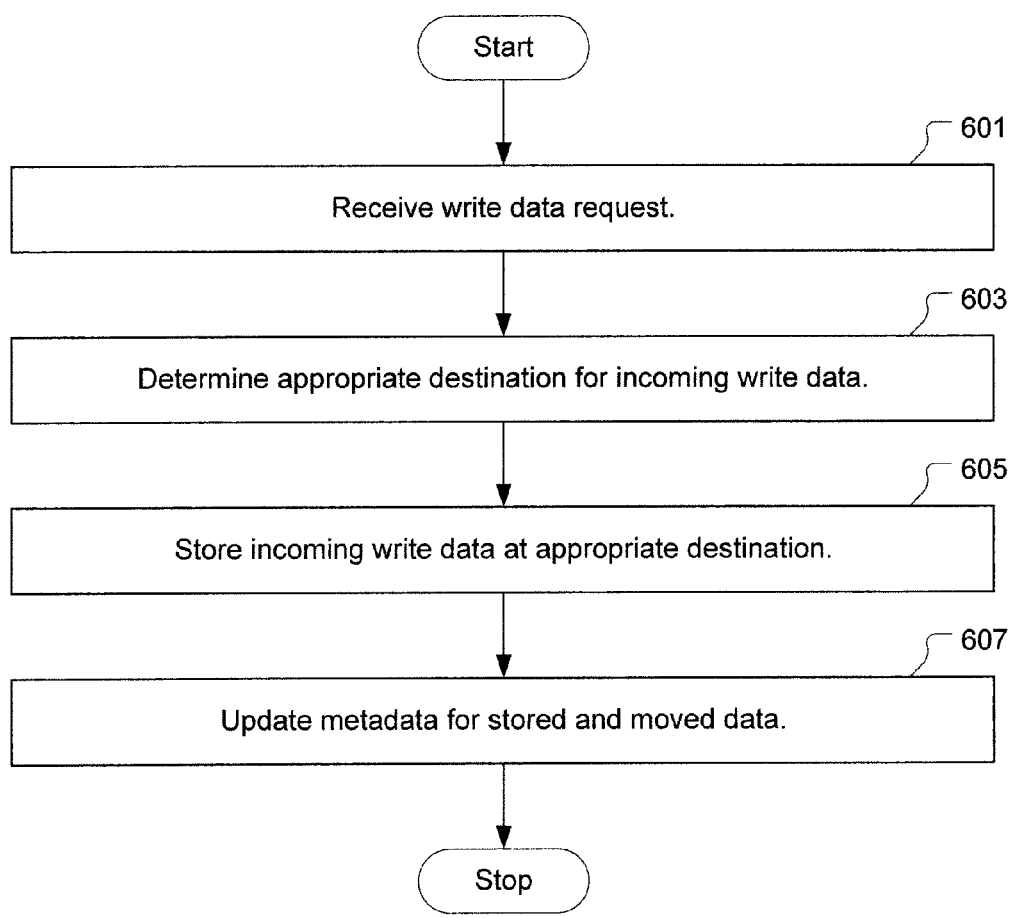
FIG. 6 is an illustration showing a flowchart of a method for operating the storage controller of FIG. 5 to write data to the storage volume, in accordance with one embodiment of the present invention.

FIG. 6 is an illustration showing a flowchart of a method for operating the storage controller 101 of FIG. 5 to write data to the storage volume, in accordance with one embodiment of the present invention. In an operation 601, a write data request is received at the storage controller 101 from the server 501. An operation 603 is then performed by the storage controller 101 to determine an appropriate storage destination for the incoming data blocks in the write request. In the example of FIG. 5, the incoming data blocks can be stored in either the controller cache 503, the SSD 505, or the HDD 507, depending on the size of the incoming data blocks and a current state of the controller cache 503 and storage volume.

If the incoming data blocks are small in size and sufficient storage space is available in the controller cache 503, the incoming data blocks may be stored in the controller cache 503. This will allow the incoming data blocks to be most quickly accessed as the storage controller 101 learns about the access patterns associated with the incoming data blocks. Also, if the sizes of the incoming data blocks permit, the incoming data blocks, or portion thereof, can be combined with the data blocks already in the controller cache 503, and that combination of data blocks can be stored on the SSD 505, thereby freeing up storage space in the controller cache 503 for subsequent incoming data blocks.

Also, if the aggregate size of the incoming data blocks is approximately equal to the optimal write size for the SSD 505, the incoming data blocks may be stored directly on the SSD 505. Also, if the aggregate size of the incoming data blocks exceeds the optimal write size for the SSD 505 by a nominal amount, a portion of the incoming data blocks sized commensurate with the optimal write size of the SSD 505 may be stored directly on the SSD 505, with a balance of the incoming data blocks being stored in the controller cache 503. Additionally, if the aggregate size of the incoming data blocks is large enough to satisfy an administrator-set threshold size value, then the incoming data blocks may be written directly to the HDD 507.

It should be understood that the above-mentioned alternatives for determining the appropriate destination for incoming write data in operation 603 are provided by way of example and are not intended to be inclusive. The storage controller 101 can implement many different policies to determine the appropriate destination for incoming write data in operation 603, so long as the implemented policy provides for adequate efficiency in the storage and retrieval of data blocks. From the operation 603, the method proceeds with an operation 605 for storing the incoming data blocks at the appropriate destination as determined in operation 603. The method then proceeds with an operation 607 in which the base metadata 509 is updated to reflect the storage locations of the incoming data and any movement of previously stored data, if applicable.

Figure 7:
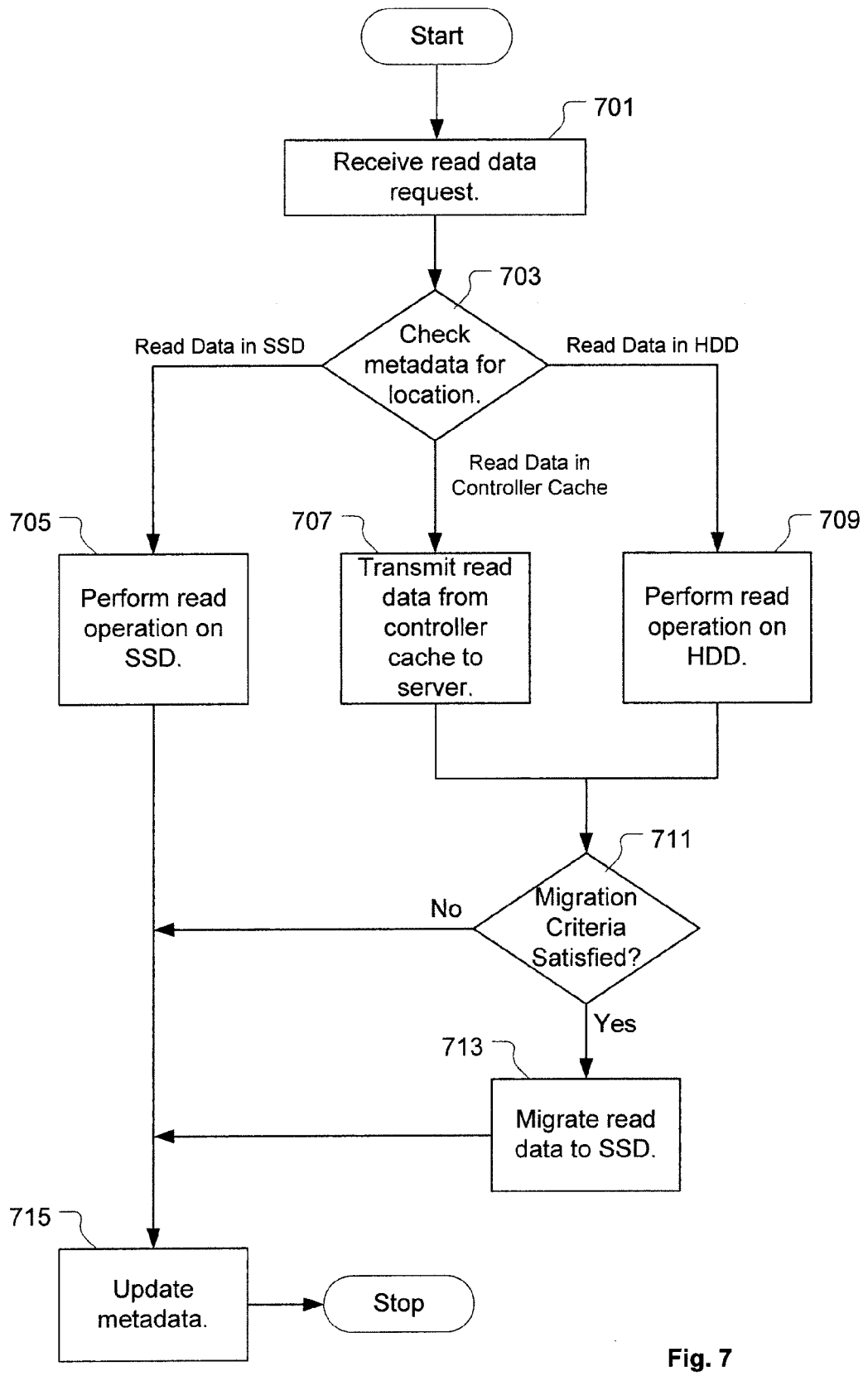
FIG. 7 is an illustration showing a flowchart of a method for operating the storage controller of FIG. 5 to read data from the storage volume and migrate data within the storage volume, in accordance with one embodiment of the present invention.

FIG. 7 is an illustration showing a flowchart of a method for operating the storage controller 101 of FIG. 5 to read data from the storage volume and to migrate data within the storage volume, in accordance with one embodiment of the present invention. In an operation 701, a read data request is received at the storage controller 101 from the server 501. A decision operation 703 is then performed to check the base metadata 509 for the location of the read data within the storage volume. If the base metadata 509 indicates that the read data is in the SSD 505, the method proceeds with an operation 705 to perform a read operation on the SSD 505 to transmit the read data from the SSD 505 to the server 501. If the base metadata 509 indicates that the read data is in the controller cache 503, the method proceeds with an operation 707 to transmit the read data from the controller cache 503 to the server 501. If the base metadata 509 indicates that the read data is in the HDD 507, the method proceeds with an operation 709 to perform a read operation on the HDD 507 to transmit the read data from the HDD 507 to the server 501. Additionally, it should be understood that a single read request may be directed to a data set stored across multiple devices, e.g., on two or more of the controller cache 503, the SSD 505, and the HDD 507. In this situation, the storage controller 101 is responsible for gathering the data set from the multiple devices and transmitting the data set to the server 501.

From the operation 705, the method proceeds with an operation 715 to update the auxiliary metadata 509 based on the read operation performed. Updating of the auxiliary metadata 509 in this instance may include updating access counters associated with the data blocks containing the read data. From each of operations 707 or 709, the method proceeds with an operation 711 to determine whether HDD 507-to-SSD 505 migration criteria is satisfied for the read data. In one embodiment, migration criteria may include a specification that data blocks having an access counter value greater than a specified threshold value are to be maintained on the SSD 505 as opposed to the HDD 507, so as to take advantage of the faster read capability of the SSD 505 compared to the HDD 507. It should be understood, however, that many other migration criteria may be utilized to determine when a given data block is to be migrated between the HDD 507 and the SSD 505.

If the HDD 507-to-SSD 505 migration criteria is satisfied for the read data, the method proceeds with an operation 713 to migrate the read data from the HDD 507 to the SSD 505. The method then proceeds from operation 713 to the operation 715 to update the base metadata 509 based on both the read operation performed and the migration operation performed. If the HDD 507-to-SSD 505 migration criteria is not satisfied for the read data, the method proceeds directly from the decision operation to the operation 715 to update the auxiliary metadata 509 based on the read operation performed.

Figure 8:
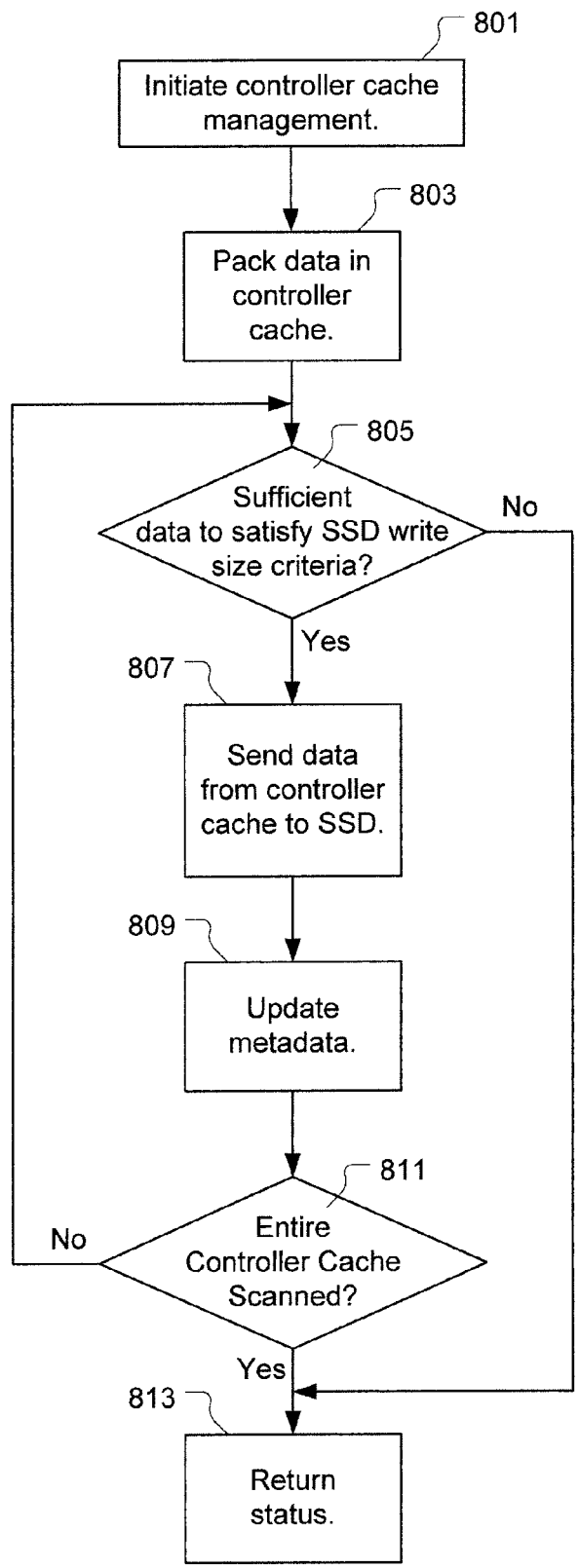
FIG. 8 is an illustration showing a flowchart of a method for operating the storage controller of FIG. 5 to manage the controller cache, in accordance with one embodiment of the present invention.

FIG. 8 is an illustration showing a flowchart of a method for operating the storage controller 101 of FIG. 5 to manage the controller cache 503, in accordance with one embodiment of the present invention. An operation 801 is performed to initiate controller cache cleanup. The method then proceeds with an operation 803 to pack the data stored in the controller cache 503. In one embodiment, the data packing of operation 803 may include collapsing of the data in the controller cache 503 into a contiguous segment of data blocks. In another embodiment, the data packing of operation 803 may include both collapsing of the data in the controller cache 503 into a contiguous segment of data blocks and compression of the data.

The method proceeds from operation 803 to a decision operation 805 to determine whether there is sufficient data in the controller cache 503 to perform an optimal SSD 505 write. If there is not sufficient data in the controller cache 503, the method proceeds with an operation 813 in which the storage controller 101 returns a status signal indicating completion of the controller cache 503 management operation. However, if there is sufficient data in the controller cache 503 to perform an optimal SSD 505 write, the method proceeds with an operation 807 in which data is transferred from the controller cache 503 to the SSD 505. Then, an operation 809 is performed to update the base metadata 509 of the storage volume based on the data transfer of operation 807.

From the operation 809, the method proceeds with an operation 811 to determine whether or not the entire controller cache 503 has been completely scanned. If the entire controller cache 503 has not been completely scanned, the method reverts back to operation 803 to again pack the data stored in the controller cache 503. If the entire controller cache 503 has been completely scanned, the method proceeds with the operation 813 in which the storage controller 101 returns the status signal indicating completion of the controller cache 503 management operation.

Figure 9:
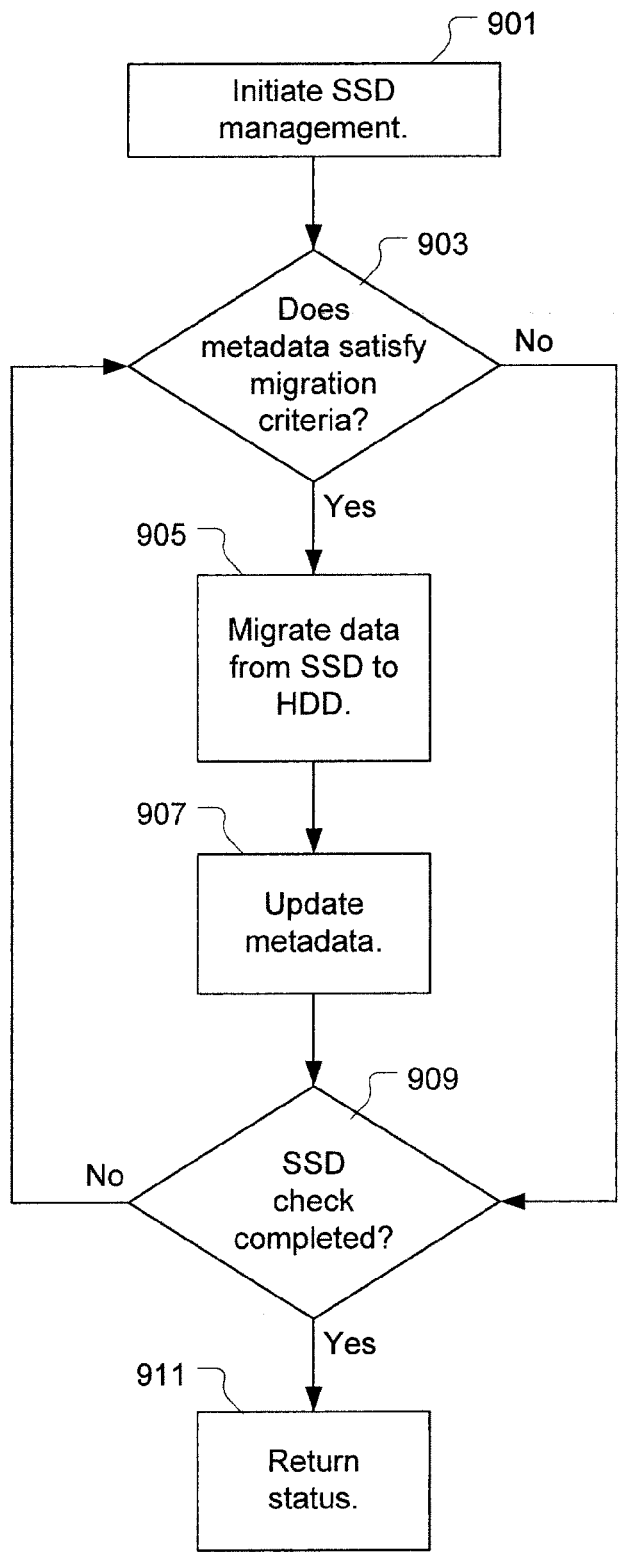
FIG. 9 is an illustration showing a flowchart of a method for operating the storage controller of FIG. 5 to manage the solid state drive, in accordance with one embodiment of the present invention.

FIG. 9 is an illustration showing a flowchart of a method for operating the storage controller 101 of FIG. 5 to manage the solid state drive (SSD) 505, in accordance with one embodiment of the present invention. An operation 901 is performed to initiate the SSD 505 management. The method proceeds with a decision operation 903 to determine whether the auxiliary metadata for the data blocks stored in a given portion of the SSD 505 satisfies SSD 505-to-HDD 507 migration criteria. In one embodiment, migration criteria may include a specification that data blocks having an access counter value less than a specified threshold value be transferred from the SSD 505 to the HDD 507, so as to free space on the SSD 505 for more frequently accessed data blocks. It should be understood, however, that many other migration criteria may be utilized to determine when data blocks are to be migrated from the SSD 505 to the HDD 507.

If the auxiliary metadata 509 indicates that the data blocks stored in the given portion of the SSD 505 are to be migrated, then the method proceeds with an operation 905 for migrating the data blocks from the SSD 505 to the HDD 507. The method then proceeds with an operation 907 to update the base metadata 503 of the storage volume based on the migration performed in operation 905. The method then proceeds with a decision operation 909 to determine whether or not all portions of the SSD 505 have been checked against the migration criteria. Also, with reference back to the decision operation 903, if the auxiliary metadata 509 indicates that no data blocks stored in the SSD 505 are to be migrated, then the method proceeds to the decision operation 909. If the decision operation 909 determines that not all data in the SSD 505 have been checked against the migration criteria, the method reverts back to the decision operation 903 to check another portion of the SSD 505 that has not yet been checked. If the decision operation 909 determines that all data in the SSD 505 have been checked against the migration criteria, the method proceeds with an operation 911 in which the storage controller 101 returns the status signal indicating completion of the SSD 505 management operation.

In accordance with the foregoing, a storage controller 101 is defined to include both data transfer logic 111 and adaptive logic 113. The data transfer logic is defined to enable block level data transfer between the storage controller 101 and multiple types of storage media within a storage volume. Each of the multiple types of storage media in the storage volume is a non-volatile data storage device that operates in accordance with a NLLBP. The multiple types of storage media in the storage volume differ in physical and performance characteristics. In one embodiment, the physical characteristics include reliability and lifetime, among others, and the performance characteristics include access type, read speed, write speed, and block size requirement, among others. Also, in one embodiment, the multiple types of storage media in the storage volume can include one or more of essentially any type of storage medium that operates in accordance with a NLLBP. For example, in one embodiment, the storage volume can include one or more rotating disk data storage device(s), one or more solid-state data storage device(s), one or more re-writable optical data storage device(s), or any combination thereof.

The data transfer logic 111 is defined to operate in accordance with multiple data transfer requirements respectively associated with the multiple types of storage media in the storage volume. In this manner, data is transferred to and from a given storage medium within the storage volume in accordance with data transfer requirements specific to the given storage medium. Moreover, the adaptive logic 113 is defined to determine in real-time which of the multiple types of storage media in the storage volume is to be used to store a given data block received by the storage controller 101.

The adaptive logic 113 is also defined to generate and maintain metadata for each data block transferred through the storage controller 101 to the storage volume. In various embodiments, the metadata can include base metadata, or both base metadata and auxiliary metadata. The base metadata for a given data block includes identification of a current storage location of the given data block in the storage volume. Also, in one embodiment, the auxiliary metadata for the given data block includes access history information for the given data block. The adaptive logic 113 is defined operate on the base and/or auxiliary metadata of the given data block to determine which of the multiple types of storage media in the storage volume is to be used to store the given data block. For example, in one embodiment, the adaptive logic 113 is defined to store data blocks of lower access frequency on a storage medium of slower read speed within the storage volume, and to store data blocks of higher access frequency on a storage medium of faster read speed within the storage volume. Additionally, in one embodiment, the adaptive logic 113 is defined to query the base and/or auxiliary metadata of the given data block to determine if the given data block is to be moved to a different type of storage medium within the storage volume.

The adaptive logic 113 is also defined to maintain the storage volume metadata on one or more storage devices within the storage volume. In one embodiment, the metadata is stored together on a single device within the storage volume. In another embodiment, the metadata is distributed across multiple storage devices within the storage volume, and can be stored thereon in different formats corresponding to the various types of the multiple storage devices. Also, in one embodiment, the metadata can be stored at multiple locations on one or more storage devices within the storage volume. It should be appreciated that the metadata can be stored in essentially any configuration in the storage volume that is suitable for the storage controller 101 and that allows for sufficient metadata read and write speed.

In one embodiment, the adaptive logic 113 is defined to transfer storage volume metadata from a particular storage device within the storage volume to the cache memory of the storage controller 101 upon startup of the storage controller 101. It should also be understood that both the data transfer logic 111 and the adaptive logic 113 are defined to maintain a normal interface between the storage controller 101 and an operating system in communication with the storage controller 101, such that the multiple types of storage media in the storage volume is not apparent to the operating system.

Also, in accordance with the foregoing, a storage system is disclosed. The storage system includes a storage volume and the storage controller 101. The storage volume includes multiple types of storage media, and is viewed as a monolithic storage volume by an operating system interfacing with the storage controller 101. Each of the multiple types of storage media in the storage volume is a non-volatile data storage device that operates in accordance with a NLLBP. In one embodiment, the multiple types of storage media in the storage volume include one or more rotating disk data storage device(s), one or more solid-state data storage device(s), one or more re-writable optical data storage device(s), or any combination thereof. It should be understood that the storage volume can include one or more of essentially any type of storage medium that operates in accordance with a NLLBP.

The storage controller 101 is defined to direct NLLBP data transfers to and from the multiple types of storage media within the storage volume. The storage controller 101 is defined to operate in accordance with multiple data transfer requirements respectively associated with the multiple types of storage media in the storage volume. In this manner, the storage controller 101 is defined to direct NLLBP data transfers to and from a given storage medium within the storage volume in accordance with data transfer requirements specific to the given storage medium. The storage controller 101 is also defined to generate and maintain metadata for each data block transferred through the storage controller 101 to the storage volume. In one embodiment, the metadata for a given data block includes identification of a current storage location of the given data block in the storage volume and access history information for the given data block. Also, in one embodiment, the storage controller 101 is defined to operate on the metadata of the given data block to determine which of the multiple types of storage media in the storage volume is to be used to store the given data block, and to determine when the given data block is to be moved to another type of storage medium in the storage volume.

Figure 10:
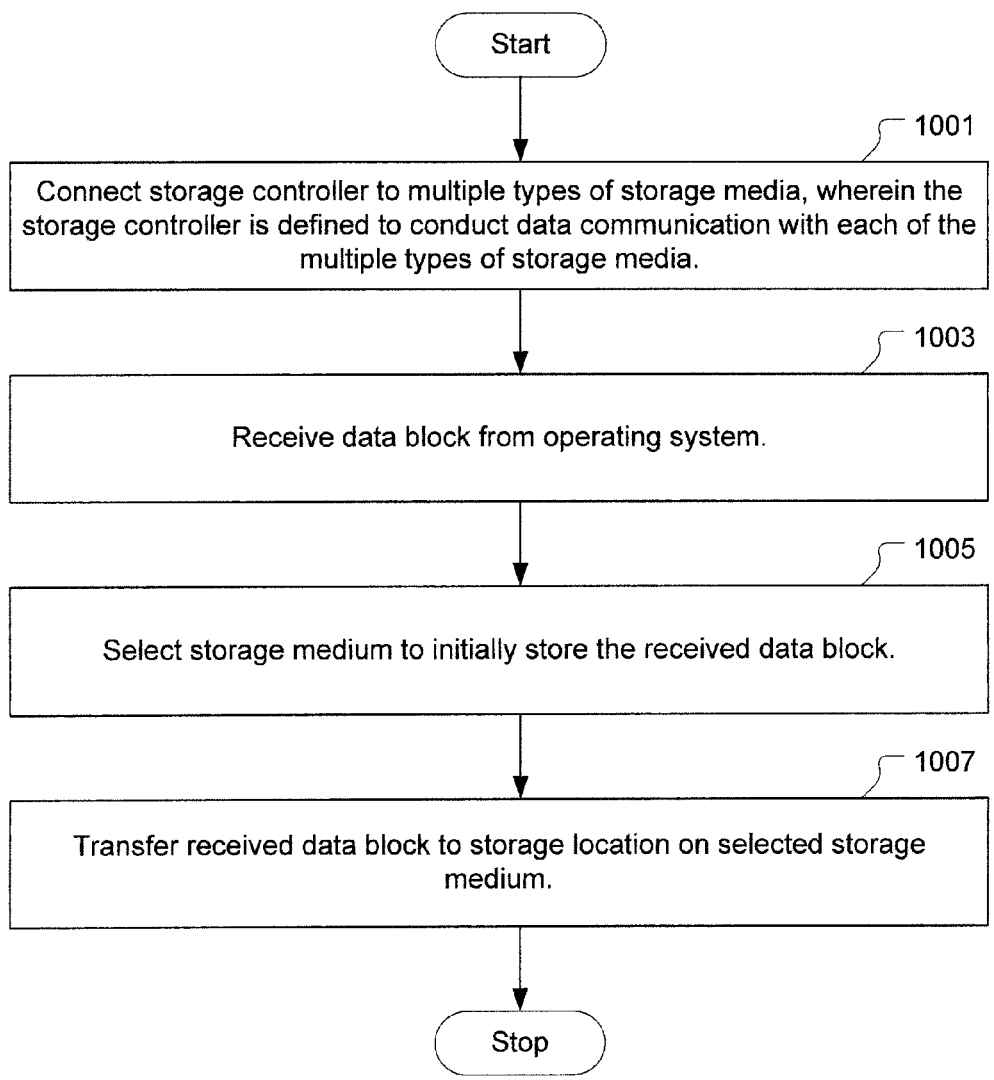
FIG. 10 shows a flowchart of a method for operating a storage controller, in accordance with one embodiment of the present invention.

FIG. 10 shows a flowchart of a method for operating the storage controller 101, in accordance with one embodiment of the present invention. The method includes an operation 1001 for connecting the storage controller 101 to multiple types of storage media within a storage volume. The storage controller 101 is defined to conduct data communication with each of the multiple types of storage media. Also, the storage volume is viewed as a monolithic storage volume by an operating system connected to the storage controller 101. Each of the multiple types of storage media in the storage volume is a non-volatile data storage device that operates in accordance with a NLLBP.

The method also includes an operation 1003 for receiving a data block from an operating system. The method then proceeds with an operation 1005 to select a storage medium, of the multiple types of storage media, to be used to initially store the received data block. An operation 1007 is then performed to transfer the received data block to a storage location on the selected storage medium. Transfer of the received data block to the storage location on the selected storage medium is performed by operating the storage controller 101 to communicate with the selected storage medium using a NLLBP specific to the selected storage medium. It should be understood that the storage controller 101 is defined to utilize multiple versions of NLLBP as respectively required for communication with the multiple types of storage media in the storage volume.

The method may further include an operation for generating metadata for the received data block. A base type of metadata includes information about a storage location of the received data block. An auxiliary type of metadata includes information about an access history of the received data block. Also, the metadata can be stored at one or more locations on one or more designated storage devices in the storage volume. Furthermore, the metadata can be loaded from its one or more storage location on the one or more designated storage devices to a cache memory of the storage controller 101 upon initialization of the storage controller 101. Then, a current state of the metadata is maintained in the cache memory of the storage controller 101, while a non-volatile copy of some or all of the metadata is maintained on the one or more designated storage devices. In one embodiment, an operation is performed to evaluate the metadata associated with a given data block in the storage volume to determine whether the given data block is to be moved to a different type of storage medium within the storage volume. In this embodiment, an operation is performed to move the given data block to the different type of storage medium within the storage volume at the appropriate time.

In view of the foregoing, it should be appreciated that the storage controller 101 disclosed herein is defined to make real-time decisions on how, when, and where data is stored within a mixed storage volume (i.e., within a storage volume that includes multiple types of storage media) without having to concern the interfacing entity (e.g., operating system) with details of the mixed storage volume. The adaptively intelligent storage process implemented by the storage controller 101 is more efficient than external application-based strategies, such as ILM, because the adaptive logic 113 of the storage controller 101 is capable of making storage decisions directly in the input/output path in real-time. Also, the storage controller 101 is defined to work directly with multiple types of storage devices in the mixed storage volume, thereby taking advantage of the properties and capabilities of the multiple types of storage devices so as to optimize performance and utilization of the mixed storage volume.

One skilled in the art will appreciate that the present invention can be defined on a semiconductor chip using logic gates configured to provide the functionality of the methods as previously discussed. For example, a hardware description language (HDL) can be employed to synthesize hardware and a layout of the logic gates for providing the necessary functionality described herein. Additionally, it should be understood that the present invention can be implemented as computer executable program instructions stored on a computer readable medium, computer firmware, computer hardware, or any combination thereof.

In one embodiment, the invention described herein can be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer or an application-specific integrated circuit (ASIC). When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A storage controller, comprising:
a cache memory configured to store data blocks;
data transfer logic defined to enable block level data transfer between the storage controller and multiple types of storage media within a storage volume, the multiple types of storage media include a rotating disk data storage device and a solid-state data storage device, wherein at least one of the multiple types of storage media within the storage volume is a shared storage medium in use by multiple storage volumes, wherein the storage controller is defined to control a unique one of the multiple storage volumes and wherein the storage controller is configured to hide sharing of the shared storage medium from different entities accessing data on the shared storage medium; and
adaptive logic defined to collect data blocks that are smaller than an optimal write size for the solid-state data storage device in the cache memory until an aggregate size of the data blocks collected in the cache memory satisfies the optimal write size for the solid-state data storage device, the adaptive logic defined to direct writing of the aggregate size of the data blocks as collected in the cache memory to the solid-state data storage device within the storage volume, the adaptive logic defined to generate and maintain metadata for each data block transferred through the storage controller to the storage volume including the data blocks collected in the cache memory, the metadata for a given data block providing a mapping of the given data block as written within the storage volume to the given data block as collected in the cache memory, the metadata for each data block including an access counter, the adaptive logic defined to increment the access counter within the metadata for a given data block each time the storage controller is directed to access the given data block, the adaptive logic defined to monitor the access counter in the metadata of the given data block in real-time to determine whether or not the access counter is above or below a threshold value, the adaptive logic defined to maintain storage of the given data 5 block in the solid-state data storage device when the access counter is above the threshold value, the adaptive logic defined to move the given data block from the solid-state storage device to the rotating disk data storage device when the access counter is below the threshold value.

2. A storage controller as recited in claim 1, wherein each of the multiple types of storage media in the storage volume is a non-volatile data storage device that operates in accordance with a native low-level block protocol.

3. A storage controller as recited in claim 2, wherein the multiple types of storage media in the storage volume differ in physical characteristics, performance characteristics, or both physical and performance characteristics.

4. A storage controller as recited in claim 3, wherein the physical characteristics include one or more of reliability and lifetime, and wherein the performance characteristics include one or more of access type, read speed, write speed, and block size requirement.

5. A storage controller as recited in claim 3, wherein the multiple types of storage media in the storage volume include one or more re-writable optical data storage devices.

6. A storage controller as recited in claim 1, wherein both the data transfer logic and the adaptive logic are defined to maintain a normal interface between the storage controller and an operating system in communication with the storage controller, such that the multiple types of storage media in the storage volume is not apparent to the operating system.

7. A storage controller as recited in claim 1, wherein the data transfer logic is defined to operate in accordance with multiple data transfer requirements respectively associated with the multiple types of storage media in the storage volume such that data is transferred to and from a given storage medium within the storage volume in accordance with data transfer requirements specific to the given storage medium.

8. A storage controller as recited in claim 7, wherein the adaptive logic is defined to maintain a non-volatile copy of some or all of the storage volume metadata on one or more storage devices within the storage volume.

9. A storage controller as recited in claim 8, wherein the adaptive logic is defined to transfer some or all of the storage volume metadata from the one or more storage devices within the storage volume to the cache memory upon startup of the storage controller.

10. A storage controller as recited in claim 1, wherein the metadata for a given data block includes identification of a current storage location of the given data block in the storage volume.

11. A storage controller as recited in claim 10, wherein the metadata for the given data block further includes access history information for the given data block.

12. A storage controller as recited in claim 11, wherein the adaptive logic is defined to operate on the metadata of the given data block to determine which of the multiple types of storage media in the storage volume is to be used to store the given data block.

13. A storage controller as recited in claim 11, wherein the adaptive logic is defined to query the metadata of the given data block to determine if the given data block is to be moved to a different type of storage medium within the storage volume.

14. A storage controller as recited in claim 1, wherein the adaptive logic is defined to maintain storage of the given data block in the rotating disk data storage device when the access counter is below the threshold value, and wherein the adaptive logic is defined to move the given data block from the rotating disk data storage device to the solid-state data storage device when the access counter is above the threshold value.

15. A storage system, comprising:
a first storage volume including multiple types of storage media including a rotating disk data storage device and a solid-state data storage device, wherein the storage volume is viewed as a monolithic storage volume by an operating system, and wherein each of the multiple types of storage media in the storage volume is a non-volatile data storage device that operates in accordance with a native low-level block protocol (NLLBP);
a second storage volume including a portion of a shared storage medium, wherein the shared storage medium is one of the multiple types of storage media within the first storage volume;
a first storage controller defined to direct NLLBP data transfers to and from the multiple types of storage media within the first storage volume;
a second storage controller defined to direct NLLBP data transfers to and from the portion of the shared storage medium,
wherein the first storage controller is configured to hide sharing of the shared storage medium from different entities accessing data on the shared storage medium,
wherein the second storage controller is configured to hide sharing of the shared storage medium from different entities accessing data on the shared storage medium,
wherein the first storage controller includes—
a cache memory configured to store data blocks,
data transfer logic defined to enable block level data transfer between the first storage controller and the multiple types of storage media within the first storage volume, and
adaptive logic defined to collect data blocks that are smaller than an optimal write size for the solid-state data storage device in the cache memory until an aggregate size of the data blocks collected in the cache memory satisfies the optimal write size for the solid-state data storage device, the adaptive logic defined to direct writing of the aggregate size of the data blocks as collected in the cache memory to the solid-state data storage device within the first storage volume,
the adaptive logic defined to generate and maintain metadata for each data block transferred through the first storage controller to the first storage volume including the data blocks collected in the cache memory, the metadata for a given data block providing a mapping of the given data block as written within the first storage volume to the given data block as collected in the cache memory wherein the second storage controller includes—
a cache memory configured to store data blocks,
data transfer logic defined to enable block level data transfer between the second storage controller and the multiple types of storage media within the second storage volume, and
adaptive logic defined to collect data blocks that are smaller than an optimal write size for the solid-state data storage device in the cache memory until an aggregate size of the data blocks collected in the cache memory satisfies the optimal write size for the solid-state data storage device, the adaptive logic defined to direct writing of the aggregate size of the data blocks as collected in the cache memory to the solid-state data storage device within the second storage volume,
the adaptive logic defined to generate and maintain metadata for each data block transferred through the second storage controller to the second storage volume including the data blocks collected in the cache memory, the metadata for a given data block providing a mapping of the given data block as written within the second storage volume to the given data block as collected in the cache memory.

16. A storage system as recited in claim 15, wherein the multiple types of storage media in each of the first and second storage volumes include one or more re-writable optical data storage devices.

17. A storage system as recited in claim 15, wherein each of the multiple types of storage media in each of the first and second storage volumes is defined to operate in accordance with a native low level block protocol.

18. A storage system as recited in claim 15, wherein the first storage controller is defined to operate in accordance with multiple data transfer requirements respectively associated with the multiple types of storage media in the first storage volume such that the first storage controller is defined to direct NLLBP data transfers to and from a given storage medium within the first storage volume in accordance with data transfer requirements specific to the given storage medium, and
wherein the second storage controller is defined to operate in accordance with multiple data transfer requirements respectively associated with the multiple types of storage media in the second storage volume such that the second storage controller is defined to direct NLLBP data transfers to and from a given storage medium within the second storage volume in accordance with data transfer requirements specific to the given storage medium.

19. A storage system as recited in claim 15, wherein the metadata for the given data block also includes access history information for the given data block.

20. A storage system as recited in claim 15, wherein the first storage controller is defined to operate on the metadata of the given data block to determine which of the multiple types of storage media in the first storage volume is to be used to store the given data block, and to determine when the given data block is to be moved to another type of storage medium in the first storage volume, and
wherein the second storage controller is defined to operate on the metadata of the given data block to determine which of the multiple types of storage media in the second storage volume is to be used to store the given data block, and to determine when the given data block is to be moved to another type of storage medium in the second storage volume.

* * * * *